United States Patent
Hu et al.

(10) Patent No.: US 10,346,880 B2
(45) Date of Patent: Jul. 9, 2019

(54) OFFERING SOCIAL DEALS BASED ON ACTIVITIES OF CONNECTIONS IN A SOCIAL NETWORKING SYSTEM

(75) Inventors: Bo Hu, San Jose, CA (US); Kelly Winters, San Francisco, CA (US); Emily Clark White, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 703 days.

(21) Appl. No.: 13/181,344

(22) Filed: Jul. 12, 2011

(65) Prior Publication Data
US 2012/0239466 A1    Sep. 20, 2012

Related U.S. Application Data

(60) Provisional application No. 61/452,577, filed on Mar. 4, 2011.

(51) Int. Cl.
*G06Q 30/02* (2012.01)
*G06Q 50/00* (2012.01)

(52) U.S. Cl.
CPC ..... *G06Q 30/0269* (2013.01); *G06Q 30/0207* (2013.01); *G06Q 30/0241* (2013.01); *G06Q 50/01* (2013.01)

(58) Field of Classification Search
CPC .......................................... G06C 30/0207–277
USPC ............................................................ 705/14
See application file for complete search history.

(56) References Cited

U.S. PATENT DOCUMENTS

| | | | |
|---|---|---|---|
| 6,269,343 B1 | 7/2001 | Pallakoff | |
| 8,010,460 B2 | 8/2011 | Work et al. | |
| 8,140,402 B1 * | 3/2012 | Mesaros | 705/26.1 |
| 2006/0085259 A1 | 4/2006 | Nicholas et al. | |
| 2006/0212355 A1 | 9/2006 | Teague et al. | |

(Continued)

FOREIGN PATENT DOCUMENTS

| | | |
|---|---|---|
| JP | 2004-054381 A | 2/2004 |
| JP | 2006-013971 A | 1/2006 |

(Continued)

OTHER PUBLICATIONS

PCT International Search Report and Written Opinion for International Patent Application No. PCT/US2012/028349, dated May 29, 2012, 12 pages.

(Continued)

*Primary Examiner* — Patricia H Munson
(74) *Attorney, Agent, or Firm* — Fenwick & West LLP

(57) ABSTRACT

Social networking systems allow deal providers to provide social deals that require participation by users connected via the social networking system for activation. A social deal is activated for a user based on actions performed by other users connected to the user. The actions performed by a participant of the social deal include actions related to the social deal as well as actions related to objects associated with the social deal, for example, purchasing an item, associated, checking in to a location associated with the social deal, or recommending the social deal. The social networking system may suggest potential participants in the social deal for a user. The deal may be activated by performing actions of one or more type. A threshold number of actions of each type may be required for activating the deal.

13 Claims, 8 Drawing Sheets

(56) References Cited

U.S. PATENT DOCUMENTS

| | | |
|---|---|---|
| 2008/0082420 A1* | 4/2008 | Kargman et al. ............... 705/14 |
| 2008/0133336 A1 | 6/2008 | Altman et al. |
| 2008/0140476 A1 | 6/2008 | Anand et al. |
| 2008/0189169 A1 | 8/2008 | Turpin et al. |
| 2008/0281622 A1 | 11/2008 | Hoal |
| 2008/0294994 A1 | 11/2008 | Kruger et al. |
| 2008/0306826 A1 | 12/2008 | Kramer et al. |
| 2009/0119167 A1* | 5/2009 | Kendall et al. ............... 705/14 |
| 2009/0157439 A1 | 6/2009 | Fuchs |
| 2009/0222348 A1 | 9/2009 | Ransom et al. |
| 2009/0319359 A1 | 12/2009 | Soza et al. |
| 2010/0030578 A1 | 2/2010 | Siddique et al. |
| 2010/0121696 A1 | 5/2010 | Green et al. |
| 2010/0228617 A1 | 9/2010 | Ransom et al. |
| 2010/0257028 A1 | 10/2010 | Hillerbrand |
| 2010/0332304 A1* | 12/2010 | Higgins ............... G06Q 30/02 705/14.16 |
| 2011/0029364 A1 | 2/2011 | Roeding et al. |
| 2011/0161130 A1 | 6/2011 | Whalin et al. |
| 2012/0029992 A1 | 2/2012 | De Facendis |
| 2012/0072271 A1 | 3/2012 | Dessert et al. |
| 2012/0130784 A1 | 5/2012 | Neuhauser et al. |
| 2012/0166267 A1 | 6/2012 | Beatty et al. |
| 2012/0209722 A1 | 8/2012 | Plut |
| 2012/0221387 A1 | 8/2012 | Liu et al. |
| 2012/0290433 A1 | 11/2012 | England et al. |
| 2013/0060623 A1 | 3/2013 | Walker et al. |
| 2013/0060637 A1 | 3/2013 | Walker et al. |

FOREIGN PATENT DOCUMENTS

| | | |
|---|---|---|
| JP | 2008-243008 A | 10/2008 |
| JP | 2011-503701 A | 1/2011 |
| KR | 10-0749093 | 8/2007 |
| WO | WO 2009/061616 A1 | 5/2009 |

OTHER PUBLICATIONS

U.S. Appl. No. 13/018,716, filed Feb. 1, 2011 (copy not enclosed).
U.S. Appl. No. 13/019,061, filed Feb. 1, 2011 (copy not enclosed).
Mexican Institute of Industrial Property, Office Action, Mexican Patent Application No. MX/a/2013/010433, dated Mar. 12, 2015, eight pages.
Canadian Intellectual Property Office, Office Action, Canadian Patent Application No. 2,829,103, dated Jun. 19, 2015, two pages.
Japan Patent Office, Notification of Reasons for Rejection, JP Patent Application No. 2013-558067, dated Feb. 2, 2016, five pages.
The Korean Intellectual Property Office, Notice of Preliminary Rejection, KR Patent Application No. 10-2013-7026716, dated Nov. 30, 2017, 12 pages.
Intellectual Property India, Patent Office, First Examination Report, Indian Patent Application No. 6386/CHEBP/2013, dated Mar. 29, 2019, six pages.

* cited by examiner

FIG. 4

OFFERING SOCIAL DEALS BASED ON ACTIVITIES OF CONNECTIONS IN A SOCIAL NETWORKING SYSTEM

CROSS REFERENCES TO RELATED APPLICATIONS

This application claims the benefit of U.S. Provisional Patent Application No. 61/452,577 filed Mar. 14, 2011, which is incorporated by reference in its entirety.

BACKGROUND

This invention relates to deals in social networking systems and in particular to social deals that allow participation by multiple users of a social networking system.

Providers of services and/or products offer deals to potential or current customers to entice them to make purchases. A deal is an offer to sell a product or service to a customer, oftentimes including a particular benefit available to customers who buy the product or service through the deal. For example, a deal may offer a product or service at a discounted price, such as a fixed percent of the original price or a fixed amount below the original price. A deal may offer a discount on a future purchase of a product/service upon a purchase of a similar or a different product/service. A deal may also offer access to inventory not open to the general population. For example, a deal may provide discount on a second product upon purchase of a first product. Deals are often offered by providers who are different from the actual seller of the product or service. The deal provider manages the deal purchase transaction and gives a voucher for the transaction to the customer, who can then redeem the voucher for the purchased product or service.

Providers offer deals for various reasons. Sometimes providers offer deals on products that they are trying to dispose of quickly to make room for a new line of products. Sometimes providers offer deals since they realize that users are interested in making a purchase only if there is a deal available. Conversely, consumers often closely monitor deals. Therefore, deals draw attention of users to particular products and bring the product on the radar of potential customers.

Providers are always coming up with creative ways to offer deals to get user's attention. However, if a user is not interested in a deal for a product or service, the efforts of the provider in directing these deals to the user are wasted. Therefore, providers prefer to direct their deals to users who are most likely to be interested in the deals offered in order to maximize sales of their products/services. Nevertheless, providers have not leveraged the power of social networking to make deals more effective to achieve their goals.

SUMMARY

Embodiments of the invention offer social deals to users of a social networking system. Users of the social networking system perform interactions with the social deal or with objects represented on the social networking system that are associated with the social deals, for example, images, videos, or comments. The deal is offered to a user if the interactions of other users connected to the user in the social networking system meet certain criteria. For example, if more than a threshold number of users connected to a particular users check-in to a location of a provider of the social deal, the social deal is offered to the user.

The social networking system stores information describing the social deal. The social networking system observes interactions between users of the social networking system and objects associated with the social deal. For example, an object associated with the social deal that is represented in the social deal may be an image and a user may interact with the image by downloading the image, liking the image, or commenting on the image. For a particular user, the social networking system identifies the interactions observed that are performed by other users connected to the particular user. If the observed interactions performed by other users connected to the particular user meet a predetermined criteria the social deal is offered to the particular user.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 4 is a user interface for presenting social information associated with deals of interest to the user of a social networking system, in accordance with one embodiment of the invention.

Figure 1:
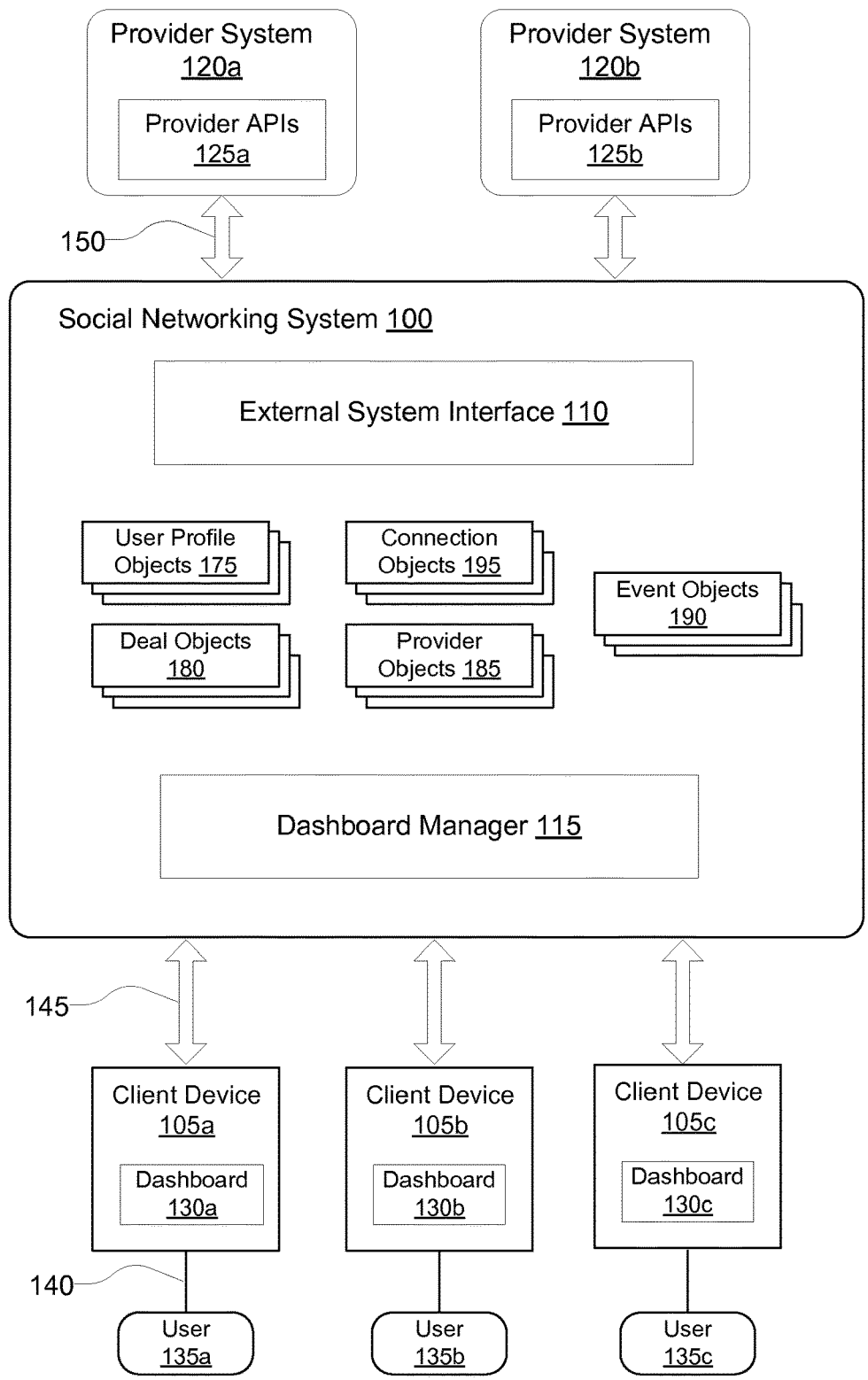
FIG. 1 is a diagram of a system environment for allowing users of a social networking system to interact with social deals, in accordance with an embodiment of the invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Embodiments use social networking systems to incorporate social information of users to improve user interactions with deals. Incorporation of social information provides better experience for the users interacting with the deals which in turn results in more users getting interested in deals. This furthers the goals of the providers since the providers are attempting to increase the number of potential customers by offering deals. Besides, deals provide a social experience to the users and a valuable interaction with the social networking system. Users that find the social networking system valuable are more likely to be loyal to the social networking system. Increased loyalty of the users to the social networking system is likely to attract more providers offering advertisements and deals via the social networking system. Since social networking systems derive revenue from advertisements, this provides increased revenues for the social networking systems.

One way embodiments incorporate social information in deals is by allowing multiple users connected via a social networking system to participate in a deal. A deal that is activated by participation of users connected via a social networking system is called a social deal. The social networking system may allow multiple users to participate in the social deal and check if connections exist between the participants before activating the social deal. Alternatively, the social networking system may limit the participation of users in a social deal to connections of existing participants, for example, via a user interface.

The social networking system propagates information regarding participation of users in a social deal to their connections via communication channels including newsfeed and notifications. Since the connections that learn about the social deal get an opportunity to see how their friends used and benefitted from the social deal, they are more likely to be interested in the social deal. As a result, these connections are themselves likely to participate in the social deals. This causes the information regarding the social deals to spread in a viral fashion. Information that spreads virally is likely to propagate faster than information propagated via conventional advertisements on websites.

Information Describing a Deal

A deal is associated with an offer made to a user that provides certain benefits to the user upon acceptance. The benefit offered by a deal corresponds to a value of the deal or a price of the deal. For example, a deal that offers higher benefits provides higher value compared to a deal that offers lower benefits. In an embodiment, a user can purchase a deal by paying a price for the deal. The user can subsequently redeem the deal by making a purchase or a transaction. Providers often present a deal to the users along with their advertisements. Typically, the benefits offered by a deal are associated with a transaction, for example, a purchase of a product or service offered by the provider. A transaction between a customer and a provider involves an exchange between a user and a provider, wherein the customer provides money to the provider and the provider provides one or more products and/or services to the customer. However a transaction involving a deal provides additional benefits to the user.

Benefits offered by a deal can include a reduction in the price of the product and/or service. Alternatively, the benefits provided by a deal may include advantages including free shipping, a coupon for a subsequent purchase, a reduction in price of a different item bought in the same transaction, no sales tax, and the like. The benefits associated with a deal are referred to as the value of the deal or the price of the deal.

A deal may be associated with a time period. For example, a deal can only be used after a start date and before an end date. The deal may be associated with other limits on the purchases. For example, the deal may apply to all items purchased in a transaction, the deal may apply to all purchases made on a particular day, or the deal may apply to a single item. These limits on the purchases applicable to a deal are called the maximum redemption of the deal.

The deal may also be associated with a location. For example, one location of a store may offer a deal but other locations may not. A deal may also be associated with an event. A deal may be applicable to in-store purchases as opposed to online purchases, or the deal may be for online purchases only. The deal may also have a specific redemption method. For example, the deal may require a user to present a coupon or a coupon code, the deal may be automatically offered upon making a purchase, the deal may require use of a particular type of payment mechanism including a specific type or credit or debit card, or the deal may require presentation of proof of membership in a club.

A deal may be associated with other conditions, for example, the number of purchases made by the user must exceed a threshold value or the total value of the purchases must exceed an amount. When the required conditions associated with a deal are satisfied, the deal is considered activated. The activation of a deal may require an explicit status change by the provider of the deal. Alternatively, the activation may be automatic upon satisfaction of the required conditions and the user gets the benefits of the deal when the user completes an applicable transaction. The user may be required to complete a transaction associated with the purchase to redeem an activated deal.

Activating a deal comprises marking the deal as ready for use by a user. For example, a deal that is activated can be presented to the user as a coupon that can be redeemed by the user. An activation of a deal may require certain actions to be performed by multiple users. For example, the activation of a deal may require multiple users to be present at a location associated with the provider. If more than a threshold number of user's friends' check-in to a location along with the user, the deal is activated. Each user who participates in the activation of the deal is called a participant of the deal. The deal may offer benefits to one user or to all the participants of the deal. For example, a restaurant deal activated by a number of friends present at the location may offer a price reduction upon payment by a single user or it may offer price reduction to each participant making a separate payment. In an embodiment, activation of the deal comprises redemption of the deal. For example, if more than a threshold number of connections of a user purchase tickets for an event (for example, a concert) via the social networking system, a social deal provides the tickets at a discounted price. In this case, the activation of the deal happens when the deal is redeemed.

A reference to a deal in this disclosure may refer to an instance of deal associated with a particular user or a type of a deal offered by a provider. The context of the disclosure clarifies whether a deal refers to an instance of a deal or deals of a particular type. For example, a deal may refer to an offer by a particular provider that gives 20% discount on a product if purchased before a given date. A deal may also refer to an instance of a social deal that is specific to a user and requires participation by connections of the user. There may be multiple instances of the deal created for different user. Each instance of the deal stores information specific to the deal, for example, users participating in that instance.

Deals System Environment

FIG. 1 is a diagram of a system environment for allowing users of a social networking system to interact with social deals, in accordance with an embodiment of the invention. The users 135 interact with the social networking system 100 using client devices 105. The provider systems 120 (also referred to as "provider" herein) interact with the social networking system 100 to provide information describing the deals. Some embodiments of the systems 100, 120, and 130 have different and/or other modules than the ones described herein, and the functions can be distributed among the modules in a different manner than described here.

FIG. 1 and the other figures use like reference numerals to identify like elements. A letter after a reference numeral, such as "130A," indicates that the text refers specifically to the element having that particular reference numeral. A reference numeral in the text without a following letter, such as "130," refers to any or all of the elements in the figures bearing that reference numeral (e.g. "130" in the text refers to reference numerals "130A" and/or "130B" in the figures).

A provider system 120 comprises a provider application programming interface (API) module 125 that allows the social networking system 100 to interact with the provider system. In an embodiment, the provider APIs 125 may be implemented as a web service. The provider APIs 125 allow the social networking system 100 to send requests for information to the provider system 120 and receive information associated with the deals from the provider system 120. For example, the social networking system 100 may send a request to the provider system 120 to determine whether a user of the social networking system 100 is an existing customer of the provider system 120.

In one embodiment, the client device 105 used by a user 135 for interacting with the social networking system 100 can be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 105 can be any device having computer functionality, such as a personal digital assistant (PDA), mobile telephone, smart-phone, etc.

The client device 105 executes a user interface called dashboard 130 to allow the user 135 to interact with the social networking system 100. The dashboard 130 allows the user 135 to perform various actions related to deals. These actions include retrieving information describing deals that are likely to be of interest to the user, recommending deals to connections of the user, participating in a social deal, checking in to a location associated with a deal provider, and making a purchase using the deal. In an embodiment, the dashboard 130 is presented to the user via a browser application that allows a user to retrieve and present information from the internet or from a private network.

The social networking system 100 offers its users the ability to communicate and interact with other users of the social networking system 100. Users join the social networking system 100 and then add connections to a number of other users of the social networking system 100 to whom they desire to be connected. As used herein, the term "friend" refers to any other user to whom a user has formed a connection, association, or relationship via the social networking system 100. The term friend need not require that users to actually be friends in real life, (which would generally be the case when one of the members is a business or other entity); it simply implies a connection in the social networking system 100.

The social networking system 100 maintains different types of objects representing entities, for example, user profile objects 175, connection objects 195, event objects 190, deal objects 180, and provider objects 185. An object may be stored for each instance of the associated entity. A user profile object 175 stores information describing a user of the social networking system 100. A connection object 195 stores information describing relations between two users of the social networking system or in general any two entities represented in the social networking system 100. The event objects 190 store representations of real-world events in the social networking system 100. The deal objects 180 represent deals and the provider objects represent providers in the social networking system 100. These objects are further described in detail herein.

Figure 2:
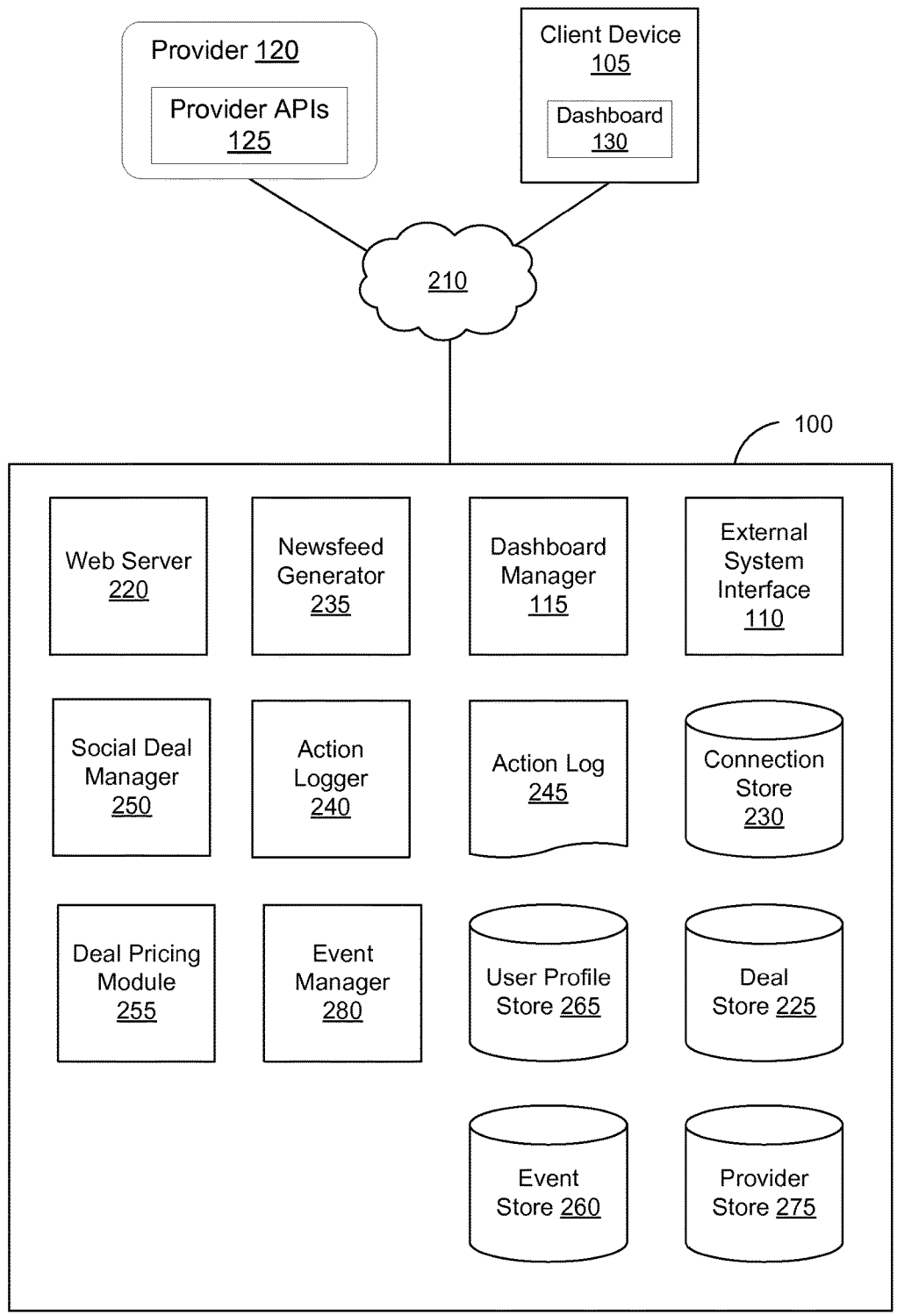
FIG. 2 is a diagram of the system architecture of a social networking system for allowing users of a social networking system to interact with social deals, in accordance with an embodiment of the invention.

The social networking system 100 comprises an external system interface 110, a dashboard manager 115 and various modules described in FIG. 2. The dashboard manager 115 allows users of the social networking system 100 to interact with the deals via the dashboard 130 user interface. The dashboard manager 115 presents information describing deals of interest to a user. For example, the dashboard manager may present different types of deals to two users that have different interests.

The dashboard manager 115 allows a user 135 to perform various actions associated with the deal. These actions include purchasing the deal, recommending the deal to a connection, commenting on the deal, following the deal, liking the deal, participating in a social deal, uploading an image associated with the deal, for example, uploading an image taken at a location associated with the deal for display as part of the user's profile. A user purchases a deal by completing a transaction that takes advantage of the deal. For example, if the deal offers a 20% discount on purchase of a product, the user purchases the deal by purchasing the product and redeeming the deal for the purchase.

The dashboard manager 115 receives requests from the user 135 for performing actions related to deals. A user 135 sends requests to the dashboard manager 115 via the dashboard 130. For example, a user 135a may send a request to recommend a deal to a connection of the user 135a (say, user 135b). The dashboard manager 115 may invoke other modules of the social networking system 100 shown in FIG. 2 to perform a requested action.

The external systems interface 110 of the social networking system 100 allows various modules of the social networking system 100 to interact with external systems including the provider systems 120. For example, a module of the social networking system 100 may update the provider system 120 with information describing a transaction made by a user 135. The external system interface 110 invokes the provider APIs 125 for interacting with the provider systems 120. The external systems interface 110 also allows external systems to interact with the social networking system 100, for example, to access the social network information or to update information present in the social networking system 100. The external system interface 110 provides APIs that allow external systems to interact with the social networking system 100. For example, a provider system 120 may send information describing new deals from the provider by invoking appropriate APIs supported by the external systems interface 110. The requests received from external systems are authenticated by the social networking system 100 to ensure that the external system has permissions to perform the requested actions.

The social networking system 100 comprises modules other than those shown in FIG. 1, for example, modules illustrated in FIG. 2 that are further described herein.

Social Networking System Architecture

FIG. 2 is a diagram of the system architecture of a social networking system for allowing users of a social networking system to interact with social deals, in accordance with an embodiment of the invention. The social networking system 100 includes a web server 220, a newsfeed generator 235, a dashboard manager 115, an external system interface 110, an action logger 240, an action log 245, a social deal manager 250, a deal pricing module 255, an event manager 280, a user profile store 265, a connection store 230, a deal store 225, an event store 260, and a provider store 275. In other embodiments, the social networking system 100 may include additional, fewer, or different modules for various applications. Conventional components such as network interfaces, security mechanisms, load balancers, failover servers, management and network operations consoles, and the like are not shown so as to not obscure the details of the system.

The social networking system 100 allows users to communicate or otherwise interact with each other and access content, as described herein. The social networking system 100 stores user profile objects 175 in the user profile store 265. The information stored in user profile store 265 describes the users of the social networking system 100, including biographic, demographic, and other types of descriptive information, such as work experience, educational history, gender, sexual preferences, hobbies or preferences, location, and the like. The user profile store 265 may also store information provided by the user, for example, images, videos, comments, and status updates. Images of users may be tagged with the identification information of the appropriate users displayed in an image.

Any action that a particular user takes using the social networking system 100 is associated with the user's profile 175, through information maintained in a database or other data repository. Such actions may include, for example, adding a connection to the other user, sending a message to the other user, reading a message from the other user, viewing content associated with the other user, seeing what deals another user likes or is following, attending an event posted by another user, among others. In addition, a number of actions described below in connection with other objects are directed at particular users, so these actions are associated with those users as well.

The connection store 230 stores data describing the connections between different users of the social networking system 100, for example, as represented in a connection object 195. The connections are defined by users, allowing users to specify their relationships with other users. For example, the connections allow users to generate relationships with other users that parallel the users' real-life relationships, such as friends, co-workers, partners, and so forth. In some embodiment, the connection specifies a connection type based on the type of relationship, for example, family, or friend, or colleague. Users may select from predefined types of connections, or define their own connection types as needed.

Connections may be added explicitly by a user, for example, the user selecting a particular other user to be a friend, or automatically created by the social networking site based on common characteristics of the users (e.g., users who are alumni of the same educational institution). Connections in social networking system 100 are usually in both directions, but need not be, so the terms "connection" and "friend" depend on the frame of reference. For example, if Bob and Joe are both connected to each other in the social networking system 100, Bob and Joe, both users, are also each other's friends. The connection between users may be a direct connection; however, some embodiments of a social networking system 100 allow the connection to be indirect via one or more levels of connections. Connections may also be established between different types of entities for example, the social networking system 100 can have an object representing a school and users of the social networking system 100 that study in the school or who are alumni of the school can connect with the school in the social networking system 100.

The deal store 225 stores information describing deals, for example, deals represented as deal objects 180. The deal object 180 is associated with metadata describing the deal and comprises data specific to an instance of the deal. An instance of a deal may be created for each user that performs certain actions associated with the deal. For example, if the activation of a deal requires participation by connections of a user, the deal object 180 stores information describing the participants in the deal. As other connections of the user perform actions that contribute towards activation of the deal, the social networking system 100 updates the information stored in the deal object 180.

The information stored in a deal object 180 comprises a description of the deal, one or more deadlines associated with the deal, for example, a start date and end date during which the deal can be used, a location associated with the deal, a type of the deal, a redemption method for the deal, maximum redemption associated with the deal, a description of the benefit offered by the deal, for example, a percent reduction in price, any conditions or rules associated with the deal, a profile page associated with the deal on the social networking system 100, and other information. The deal object also stores information identifying the deal provider 120, a user associated with the deal, and connections of the user associated with the deal, for example, if the deal activation requires participation by connections of the user. The deal object 180 may store information describing a source of the deal, for example, whether the deal was imported from an external system, or the deal was added to the social networking system 100 by the deal provider 120, or if the deal was initiated by a user of the social networking system 100.

A deal object may be associated with different types of social information including users of the social networking system 100, events represented in the social networking system 100, actions performed by users that are associated with the deal, and the like. This information may be stored in various data stores in the social networking system 100. Associations between the deal objects 180 and the relevant social information associated with the deal may be either stored explicitly in the social networking system 100 or determined as needed. The deal object 180 may be associated with actions of users associated with the deal, for example, users that liked the deal or are following the deal, users who subscribed to the deal, users who purchased the deal, users who shared or gifted the deal, users who checked-in to locations associated with the deal, comments made by users on the deal etc.

A deal store 225 also stores a category associated with each deal that describes the type of product or services associated with the deal. Examples of categories of deals include "dining," "shopping," "professional services," "beauty and spas," "health and fitness," "automotive," "pet care," "financial services," "travel," and "arts and entertainment." In an embodiment, the social networking system 100 may have a list of business categories defined to classify various businesses. The social networking system 100 stores a mapping from the business categories to the deal categories to allow objects associated with business categories to be matched with deal categories. For example, business categories "restaurant" and "bar" map to the deal category "dining" Similarly, business categories "hotel," "airport," and "transit stop" map to deal category "travel."

The event store 260 stores information describing events associated with the social networking system 100. An event object 190 may be defined for a real-world event, such as a birthday party. A user interested in attending the event may establish a connection with the event object. A user may create the event object 190 by defining information about the event such as the time and place and a list of invitees. Other users may send a reply to the invitation (an RSVP message) i.e., accept or reject the invitation, comment on the event, post their own content (e.g., pictures from the event), and perform any other actions enabled by the social networking system 100 for the event 185. Accordingly, the creator of the event object 190 as well as the invitees for the event may perform various actions that are associated with that event object 190. Events may be associated with deals, for example, an event object representing a concert may be associated with a deal providing a discounted price for the concert. The event store 260 stores the associations between events and deals.

The provider store 275 stores the provider objects 185 that store information describing the providers 120. The information describing a provider 120 includes categories associated with products/services offered by the provider, locations associated with the provider, and information needed for interacting with the provider APIs 125. In an embodiment, the provider object 185 locally caches information describing the provider that is frequently used by the social networking system 100. The locally cached information is synchronized with the information stored in the provider system 120, for example, based on a regular schedule, or every time the information stored in the provider system 120 changes. The social networking system 100 stores associations between the provider objects 185 and the deals provided by the provider 120.

The web server 220 links the social networking system 100 via the network 210 to one or more client devices 105; the web server 220 serves web pages, as well as other web-related content, such as Flash, XML, and so forth. The web server 220 provides the functionality of receiving and routing messages between the social networking system 100 and the client devices 105 as well as other external systems, for example, the provider systems 120. These messages can be instant messages, queued messages (e.g., email), text and SMS (short message service) messages, or any other suitable messaging technique. In some embodiments, a message sent by a user to another can be viewed by other users of the social networking system 100, for example, by the connections of the user receiving the message. An example of a type of message that can be viewed by other users of the social networking system 100 besides the recipient of the message is a wall post.

The action logger 240 is capable of receiving communications from the web server 220 about user actions on and/or off the social networking system 100. The action logger 240 populates the action log 245 with information about user actions to track them. Any action that a particular user takes with respect to another user is associated with each user's profile, through information maintained in a database or other data repository, such as the action log 245. Such actions may include, for example, adding a connection to the other user, sending a message to the other user, reading a message from the other user, viewing content associated with the other user, attending an event posted by another user, among others. In addition, a number of actions described below in connection with other objects are directed at particular users, so these actions are associated with those users as well. When a user performs an action using the social networking system 100, the social networking system 100 adds an entry for that action to the log 245.

The social deal manager 250 maintains information describing social deals and actions associated with social deals. The social deal manager 250 maintains metadata associated with the deal, including the type of actions required to activate the social deal, whether the actions have to be performed by the user or by the connections of the user, and the number of actions of each type required to activate the deal. Examples of types of actions that can activate a social deal include checking in to a location, making a purchase, sending a recommendation of the deal to a connection, registering with the provider, and the like. The social deal manager 250 monitors the actions performed by the connections of the user and the actions performed by the user to determine if an action associated with the social deal is performed. The social deal manager 250 manages the state of a social deal, for example, the number of actions of different types that have been performed so far towards activation of the deal and the number and types of actions remaining for activation of the deal.

In some embodiments, the system 100 is not a social networking system but communicates with a social networking system to obtain the necessary social network information. The system 100 may communicate with the social networking system, for example, using APIs provided by the social networking system. In these embodiments, some modules shown in FIG. 2 may run in the system 100, whereas other modules may run in the remote social networking system. For example, the modules including the deal pricing module 255 may run in the system 100 but modules deal store 225, user profile store 265, connection store 230, and action log 245 may exist in a separate social networking system.

The interactions between the client devices 105 and the social networking system 100 as well as the interactions between the provider 120 and the social networking system 100 are typically performed via a network 210, for example, via the internet. The network 250 enables communications between the client device 220 and the social networking system 210. In one embodiment, the network 210 uses standard communications technologies and/or protocols. In another embodiment, the entities can use custom and/or dedicated data communications technologies instead of, or in addition to, the ones described above. Depending upon the embodiment, the network 210 can also include links to other networks such as the Internet.

Deals Dashboard

Figure 3:
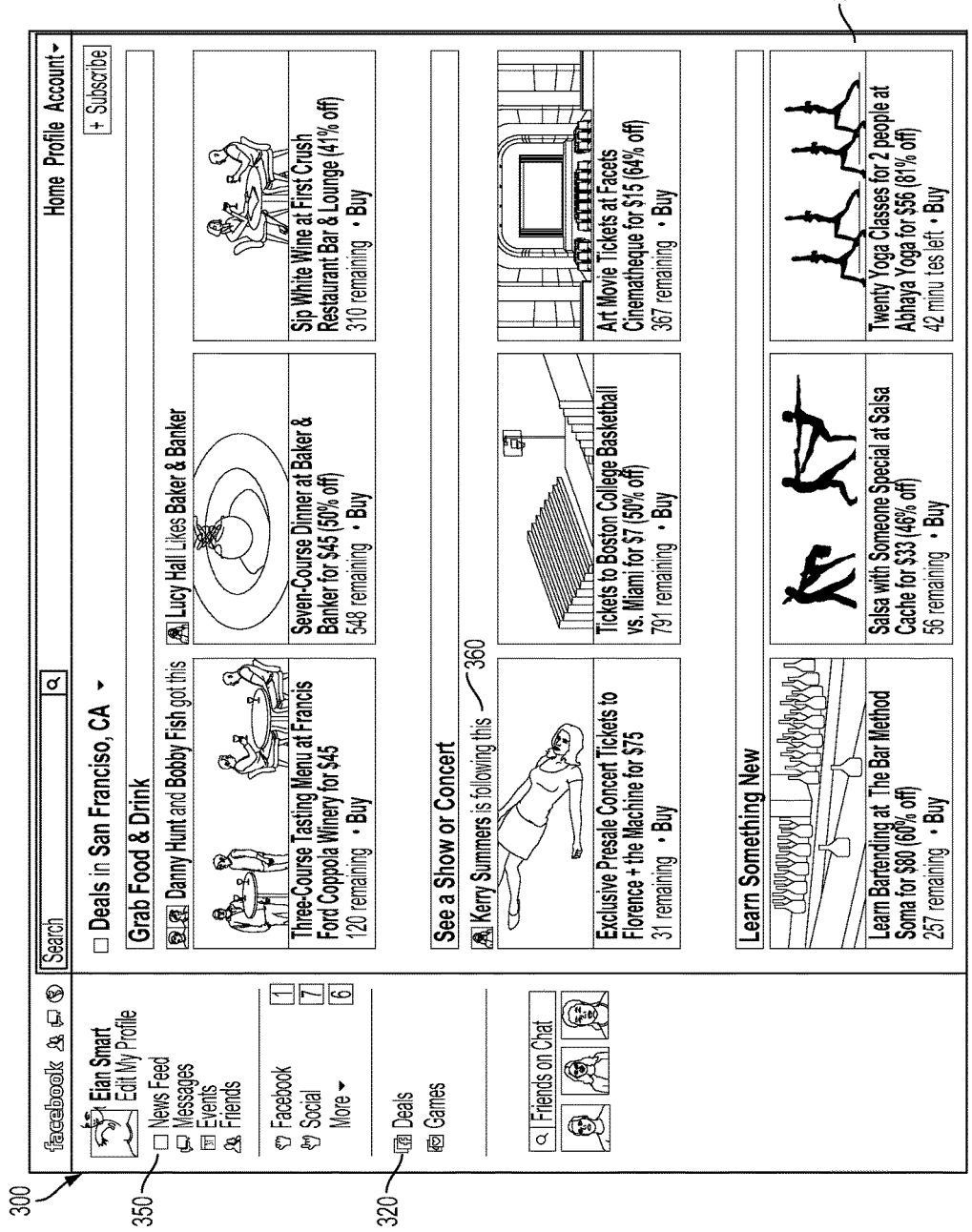
FIG. 3 is a user interface for allowing a user of a social networking system to interact with deals of interest to the user, in accordance with an embodiment of the invention.

The dashboard 130 provides a user interface for allowing a user of a social networking system 100 to view and interact with deals. FIG. 3 shows screenshots of the dashboard, in accordance with an embodiment of the invention. The dashboard 130 can be a part of a user interface that allows various types of user interactions with a social networking system 100. A user viewing the user's information 300 on a social networking system 100 (for example, from the user's home page) can request different type of information from the social networking system 100 by pressing buttons or links 350. The different types of information requested by the user include newsfeed stories of interest to the user, messages received by the user via the social networking system 100, connections of the user, events associated with the user, and the like. The user can request information describing deals associated with the user by clicking on button 320.

Figure 4:
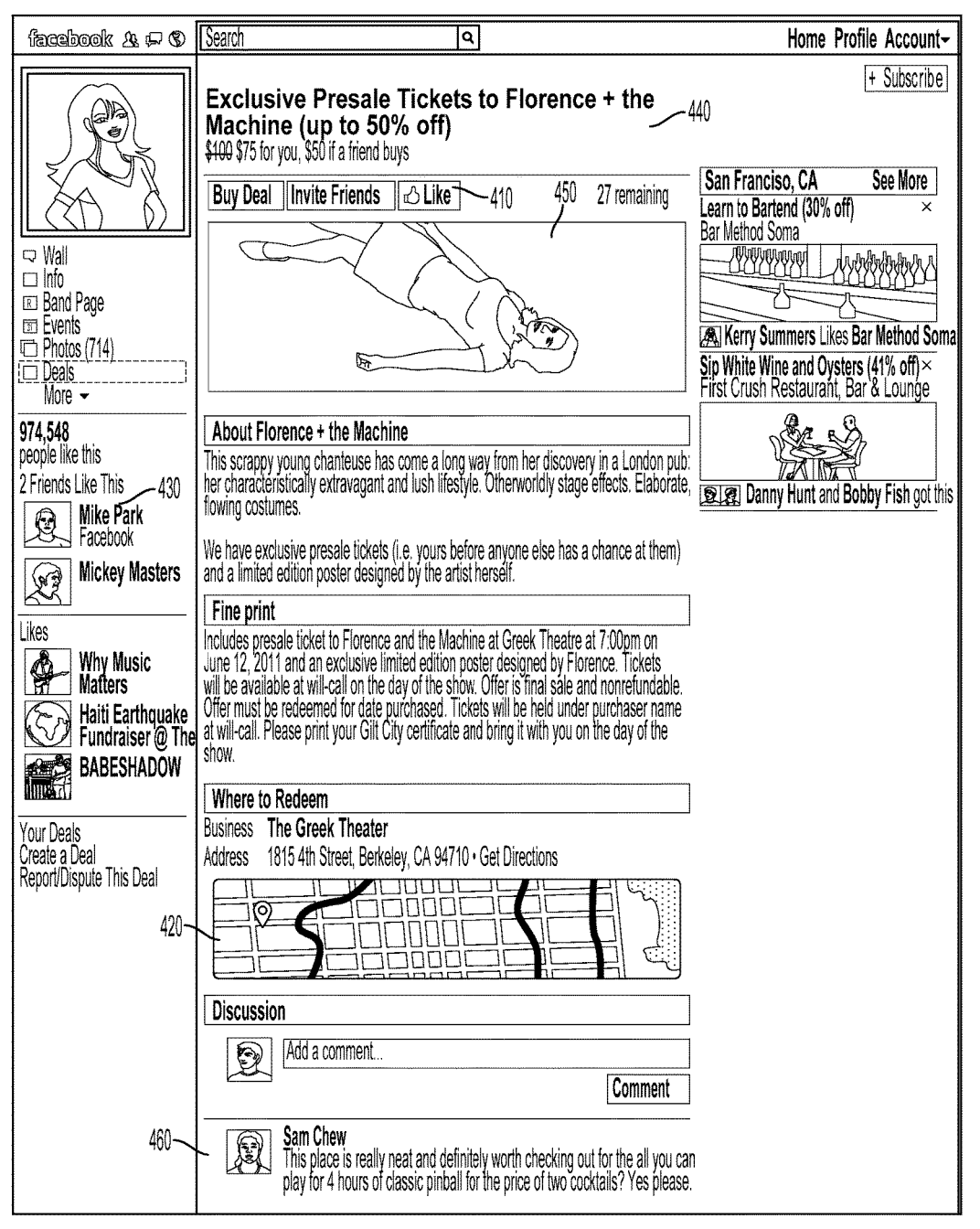

When a user requests deals information, the dashboard manager 115 receives deals relevant to the user as suggested by the suggestion module 265. The suggestion module 265 ranks various deals based on their relevance to a user and selects deals for suggestion to the user. A user can select a particular deal 310 presented to the user and request more information describing the deal. FIG. 4 show screenshots of a user interface presenting social information associated with a particular deal selected by the user. FIG. 4 shows detailed information describing the deal, for example, the location 420 of the deal, the deal price 440, and images 450 describing the product/services associated with the deal. The user interface presented in FIG. 4 allows user actions 410 associated with the deal including purchasing the deal, recommending the deal to a connection, commenting on the deal, liking the deal, participating in a social deal, uploading an image associated with the deal and the like. The dashboard 130 may also present different types of social information associated with the deal, for example, connections 430 of the user that performed an action associated with the deal, events associated with the deal, social groups associated with the deal, images associated with the deal and the like.

Figure 5:
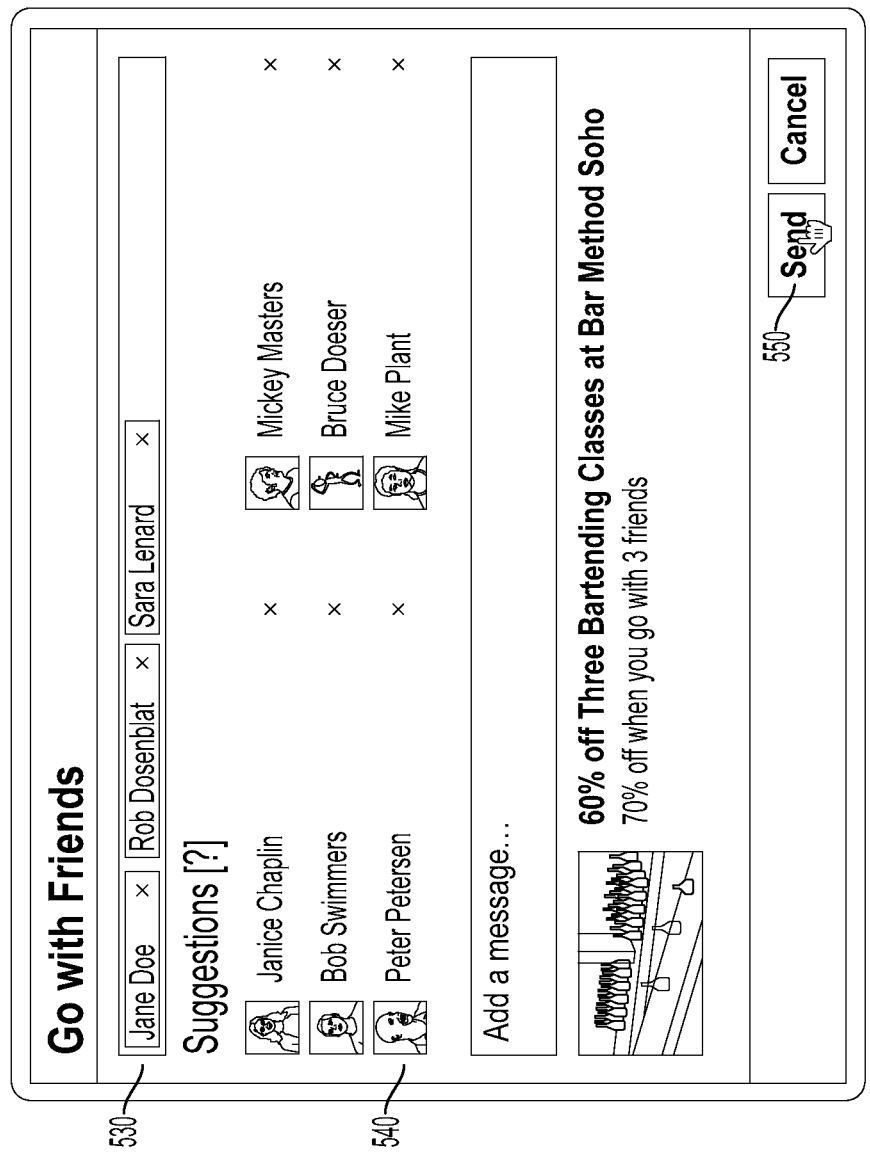
FIG. 5 shows a screenshot of a user interface displaying connections of a user of the social networking system as potential participants of a social deal, in accordance with one embodiment of the invention.

The social networking system 100 may request the user to perform certain actions associated with the deal. For example, the social networking system 100 may request the user to suggest the deal to the user's connections. FIG. 5 shows a screenshot of a user interface displaying connections of a user of the social networking system as potential participants of a social deal, in accordance with one embodiment of the invention. Typically, a user is presented with a request for suggesting the deal to the user's connections when the user purchases the deal. For example, the screens shown in FIG. 5 may be presented as part of the user interaction with the social networking system 100 for making the purchase. The user interface in FIG. 5 allows a user to add 540 connections to a list for suggesting the deal. The user can delete 530 connections previously added to the list. Once the required connections are added to the list, the user can send 550 the information describing the deal to the connections.

The user interface presented in FIG. 5 can be used to allow a user to add/delete participants in a social deal. For example, the social networking system 100 can present a list of potential participants in a social deal to the user. The user can select the participants and send the information to the social networking system 100. If the user selects more than a threshold number of participants, the social networking system 100 can activate the social deal. Alternatively, the social networking system 100 can send a message to the selected participants to confirm their participation in the deal. The social networking system 100 can activate the deal if more than a threshold number of participants confirm that they intend to participate in the deal.

Activation of Social Deals

A set of users of the social networking system 100 may interact with a social deal or with objects associated with the social deal that are represented in the social networking system. Examples of objects associated with the social deal include images, videos, comments, posts, etc. In an embodiment, the deal is activated for a user if the number of actions performed by the user's connections meets particular criteria. Examples of criteria for activating a social deal include, more than a threshold number of connections of the user performing an action associated with the deal or with objects associated with the deal. The deal may be activated for some users but may not be activated for other users, depending on whether the interactions of a particular user's connections meet the required criteria or not.

In an embodiment, activating the deal comprises offering the deal to a user. Accordingly, the deal may be offered to a first user and may not be offered to a second user even if both users have connections interacting with objects associated with the social deal. This may happen for example, if the first user has more connections that are performing the interactions compared to the second user or if the connections of the first user are performing more interactions compared to the connections of the second user.

In another embodiment, the social deal is activated by actions performed by the user that are associated with the user's connections. These actions are also associated with the deal. For example, a social deal may be activated if the user recommends the deal to more than a threshold number of connections of the user.

The social networking system 100 provides information describing the interactions of users with the social deal to connections of the user via notification, newsfeed, or other communication channels. A user receiving information regarding interactions of one user with a social deal is likely to know other users interacting with the social deal. For example, multiple friends studying in the same college may participate in a social deal for a concert. Other friends of the participants that study in the same college are likely to learn about the deal, for example, via explicit recommendations or via newsfeed describing the social deal. These friends are likely to be able to relate with the social deal since they share common characteristics with multiple participants, for example, same college, same age groups, close geographical location etc. In general, users that receive information describing a social deal from their friends in the social networking system are likely to pay attention to the information. This promotes advertisement of the deal as well as the advertisement of the provider of the deal in a viral fashion.

In an embodiment, a social deal may be activated by multiple types of actions. The social deal may specify the different types of action and the number of each type of actions that need to be performed by the connections of the user or the user for activation of the deal. For example, the social deal may require a predefined number of connections of the user to check in to a location of the provider and another predefined number of connections of the user to make a purchase from the provider in order to activate the deal.

In an embodiment, each action that counts towards activation of a social deal is assigned a score value. The social deal is activated when a weighted aggregate of the scores based on actions associated with the deal exceeds a threshold value. The weight associated with an action may depend on the type of action. For example, purchasing the deal may weigh more commenting on the deal. Similarly, recommending the deal to a user may be weighed more than commenting on the deal. The weight associated with an action performed by a connection of the user may depend on social information associated with the connection. A connection that has a higher potential for promoting the deal and/or the provider via the social networking system 100 is weighted higher than a connection with smaller potential. A user with a large number of connections has higher potential of promoting the products/services of the provider compared to a user with very few connections. Similarly, a user who interacts frequently with the user's connections in the social networking system has a higher potential of promoting the products/services of the provider compared to a user who rarely uses the social networking system 100.

Activation of a Social Deal by Actions of Connections

Figure 6:
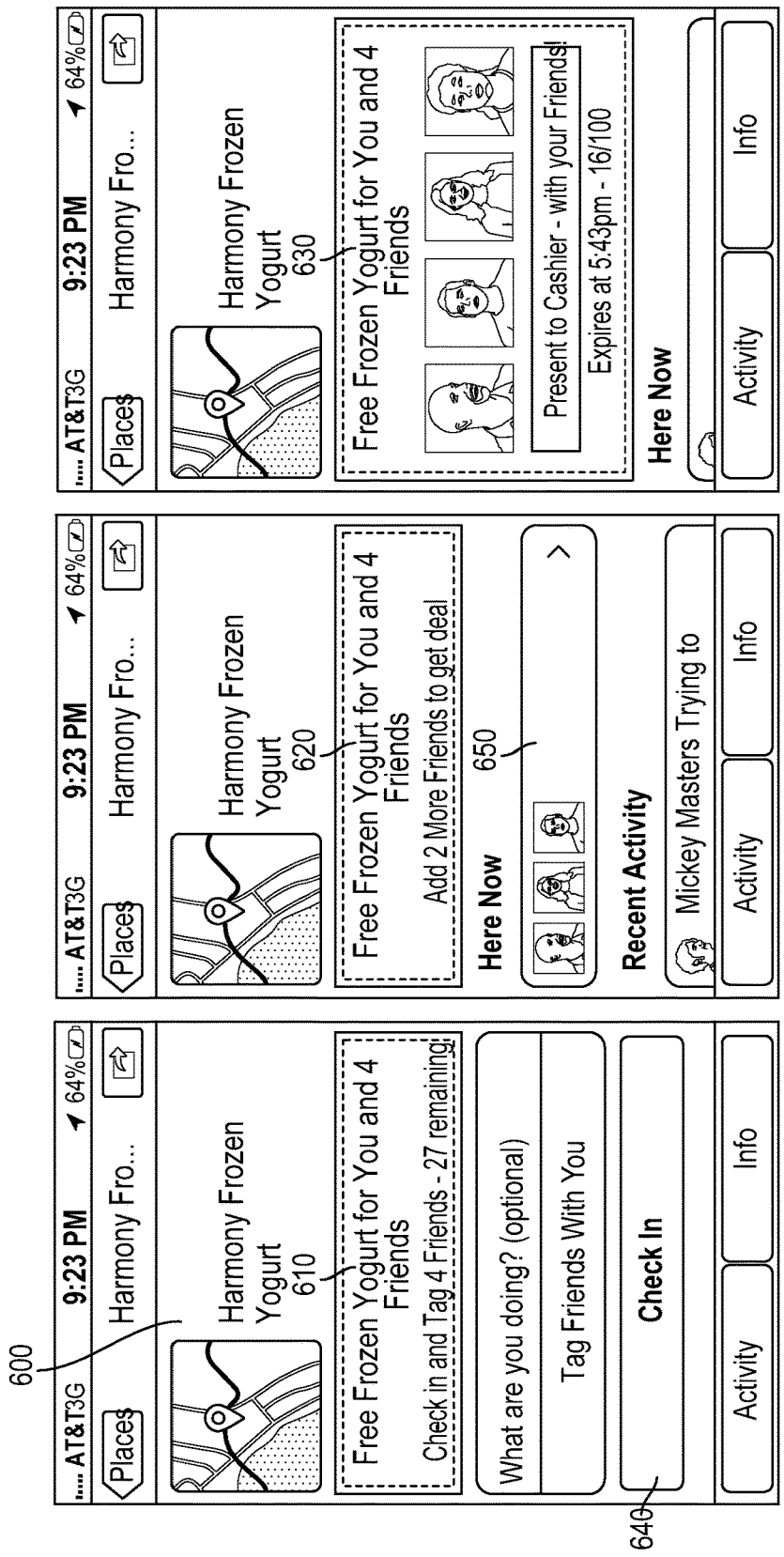
FIG. 6 is a screenshot of a social deal presented to a user of the social networking system, in accordance with one embodiment of the invention.

FIG. 6 is a screenshot of a social deal presented to a user of the social networking system, in accordance with one embodiment of the invention. FIG. 6 shows a user interface provided by the social networking system via a mobile client device, such as a smartphone carried by the user and/or the user's connections. The deal is from a provider 600. The user interface for presenting the deal can display a message 610 indicating the number of actions associated with the connections of the user needed to activate the deal. As shown in FIG. 6, the user can activate the deal by identifying four friends that plan on joining the user at a location of the provider. The user and the connections can indicate their presence at the location by checking-in 640 at the location of the provider.

The social networking system 100 may present the user (similar to the user interface in FIG. 6) with a user interface allowing the user to add potential participants to a social deal. If the user associates a few connections of the user with the deal, the user interface presents a message 620 indicating the remaining number connections of the user needed to be associated with the deal so as to activate the deal. When the user adds the required number of connections, the deal is activated and the user and/or the connections participating in the deal can enjoy the benefit offered by the deal.

In an embodiment, a user may be allowed to activate a deal at a lower price if the user is unable to reach the required number of actions or participants required for activating the social deal. For example, if a social deal requires ten connections of the user to participate in order to activate the deal and so far only eight connections of the user have participated, the user can indicate to the system that the user is willing to accept lower benefits of the social deal if the provider agrees to activate the social deal for a lower number of participants. In this situation, the user may be allowed to specify the lower benefits that are acceptable to the user. The provider may accept the proposal by the user and modify the social deal appropriately before activating it. For example, if the original benefit offered to the user was 20% price reduction upon participation by 10 of the user's connections, the social deal may be revised upon request by the user to provide 15% price reduction upon participation by 8 connections of the user.

Figure 7:
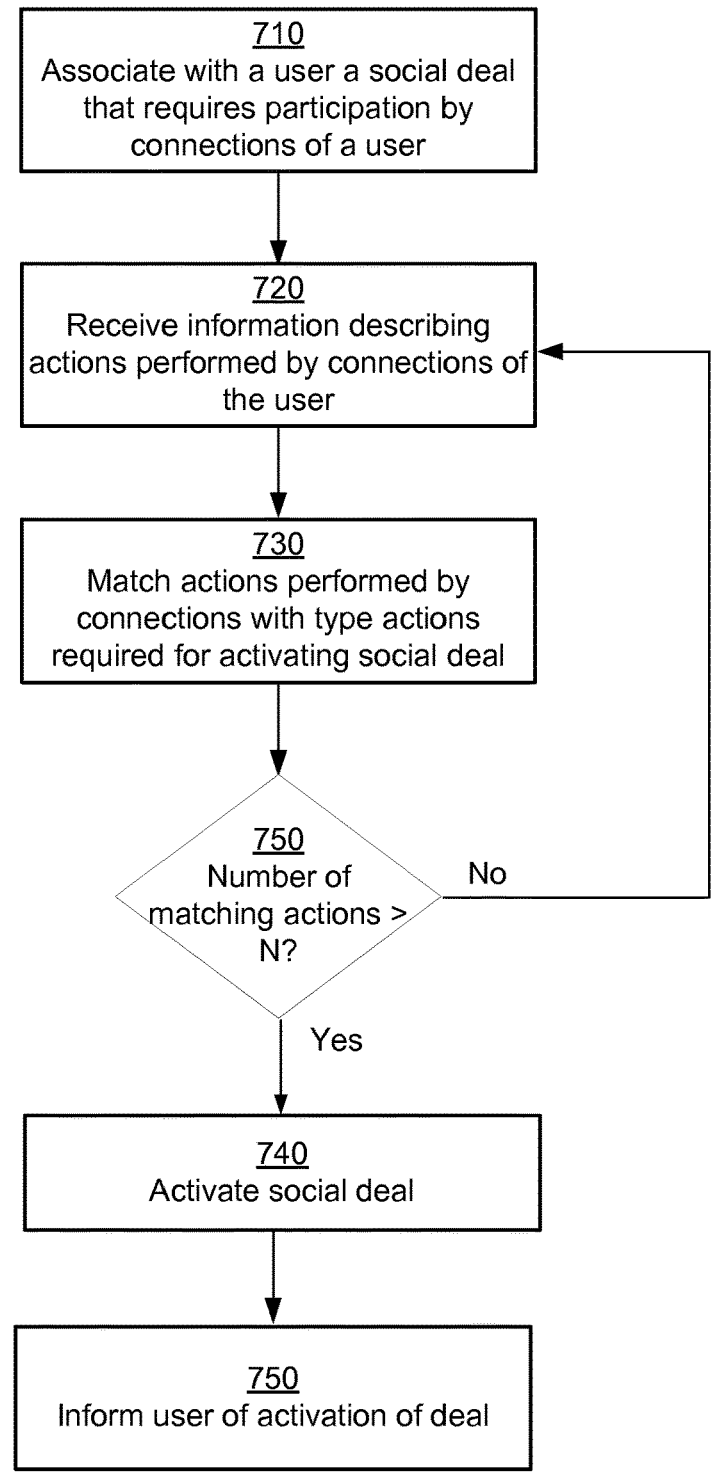
FIG. 7 is a flowchart of a process for activating a social deal based on participation by connections of a user of the social networking system, in accordance with one embodiment of the invention.

FIG. 7 is a flowchart of a process for activating a social deal based on participation by connections of a user of the social networking system, in accordance with one embodiment of the invention. Several social deals that require participation by connections of a user may be received by the social networking system 100 from different deal providers. The social networking system 100 associates 710 a social deal with a user that matches the targeting criteria for a social deal specified by the provider. The user associated with the deal may be sent information describing the social deal by the social networking system.

The social networking system receives 720 information describing various actions performed by the connections of the user. These actions may be identified by one or more modules of the social networking system including the action logger 240. In an embodiment, the social deal manager 250 monitors the actions performed by the user or the connections of the user and matches 730 them against the types of actions required for activating the social deal. If the social deal manager 250 determines that an action matches the types of actions required for activating the social deal, the social deal manager 250 keeps track of these actions.

The social deal manager 250 may maintain the information associated with a social deal in a deal object 180. The deal object 180 maintains a list of the actions that can potentially activate the deal. The social deal manager 250 checks 450 the number of matching actions against the total number of actions required to activate the deal (say N). If the number of matching actions identified so far is less than N, the total number of actions required to activate the deal, the social deal manager 250 continues receiving 720 information describing actions relevant to the deal and matching 730 them with the type of actions required to activate the deal. If the number of matching actions identified reaches N, the total number of actions required to activate the deal, the social deal manager 250 activates 740 the deal. In an embodiment, activating the deal comprises storing information describing the status of the deal as activated in the data structure corresponding to the deal. The social deal manager 250 sends messages to the users of the social networking system that can use the benefits provided by the deal to inform 750 them that the deal is activated.

An action performed by a connection may be associated with multiple deals. For example, there may be two deals provided by the same deal provider that can be activated using the same user action. In an embodiment, the social deal manager 250 ensures that a particular action is used towards activation of a single deal. For example, the deal shown in FIG. 10 may be received by a user and a connection of the user. In this case, if both the user and the connection go to the location of the deal provider and perform check-in operations, the check-in operations can get accounted for twice, once for activating the deal of the user and once for activating the deal for the connection. In an embodiment, the social deal manager 250 prevents a user from activating two deals based on the same action. For example, the social deal manager 250 may arbitrarily pick a deal that is applicable to the action and apply the action towards the deal. Alternatively the social deal manager 250 associates the action with the deal that requires fewer actions remaining to activate the deal. In an embodiment, the social deal manager 250 presents a user interface for managing social deals that allows the user to select a deal to which an action should apply. The user interface may allow the user to select an action used towards a particular deal and reapply the action towards a different deal.

In an embodiment, a user may be prevented from taking advantage of deals of certain type for a particular time interval. For example, if the user takes advantage of a deal offered by the provider by participating in a social deal, the provider may disallow the user to participate in another deal for a predetermined time interval. The length of the time interval for which the user is disallowed from taking advantage of the deal may depend on the category of the deal or the type of business associated with the deal. For example, is a user participates in a social deal from an ice cream shop, the user may not be allowed to participate in another social deal from the provider the same day. On the other hand if the user participates in a social deal on a concert, the user may be required to wait a few weeks before the user is allowed to participate in another social deal from the concert provider.

Activation of a Social Deal by Actions of User

The social deal can be activated by actions performed by the user that are associated with the user's connections as well as with the social deal. For example, a social deal may be activated when more than a threshold number of connections of the user check-in to a location associated with the deal. As another example, a social deal may be activated if the user recommends the deal to more than a threshold number of connections of the user.

Figure 8:
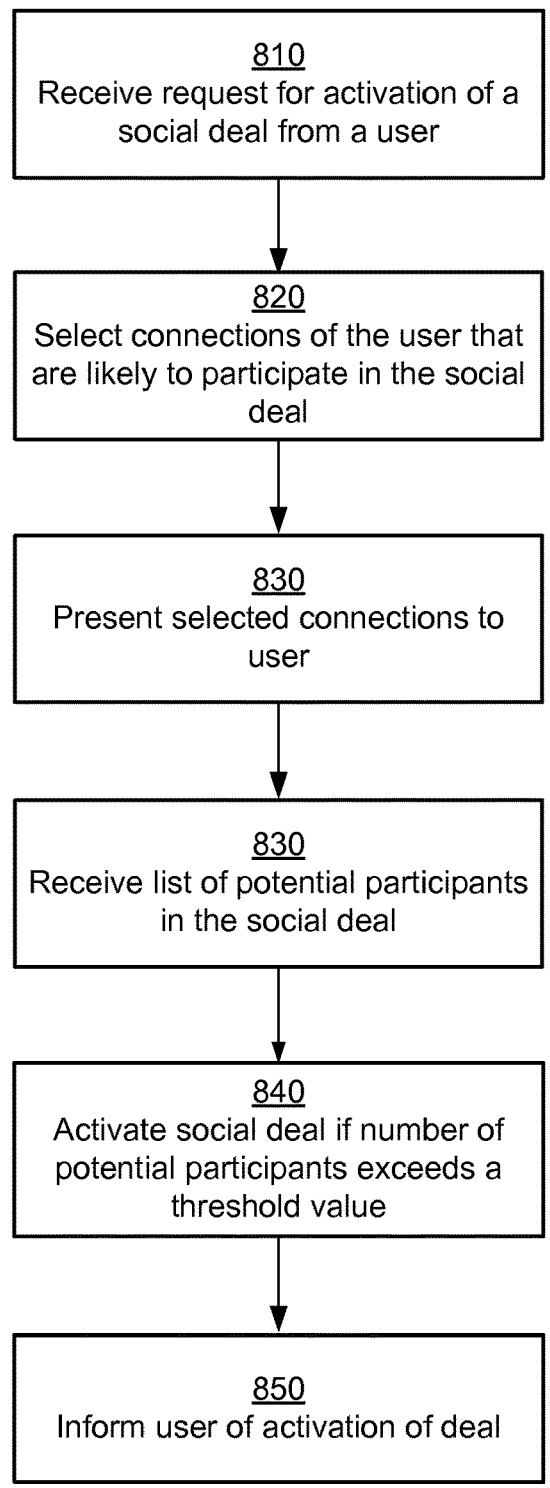
FIG. 8 is a flowchart of a process for activating a social deal based on a user's interactions with connections of the user, in accordance with one embodiment of the invention.

FIG. 8 is a flowchart of a process for activating a social deal based on a user's interactions with connections of the user, in accordance with one embodiment of the invention. The social deal manager 250 receives 810 a request for activation of a social deal from a user. The social deal manager 250 selects 820 a set of connections of the user that are likely to participate in the social deal.

The social deal manager 250 may utilize various criteria for selecting 820 the connections. A criterion for selecting 820 connections as potential participants in a social deal includes the deal targeting criteria for the deal provided by the deal provider. The social deal manager 250 ensures that the selected 820 connections satisfy the deal targeting criteria including age, gender, geographical location or other demographic criteria. Another criterion for selecting 820 matches the interests of the potential participants with the deal or the category of the deal. The interests of the users can be determined from the user profile information that is explicitly provided by the user or from the past historical data associated with a user that is stored in the social networking system 100 including the type of information retrieved by the user, comments made by the user, recommendations made by the user and the like. Other criteria for selecting 820 connections include affinity between the connection and the user, whether the connection has previously participated in deals belonging to the same category as the current deal, and whether the connection has participated in deals from the same provider. In an embodiment, the social deal manager 250 uses the currently added connections to a social deal to determine the potential participants that are suggested to the user. For example, the social deal manager 250 considers the affinity between the potential participant and the connections that have been indicated as the current participants of the deal.

The social deal manager 250 presents 830 the selected connections to the user. The selected connections may be presented by the dashboard manager 115 via a dashboard 130, for example, using a user interface similar to that presented in FIG. 5. The user can select a subset of connections presented to the user as potential participants in the deal. The social deal manager 250 receives 830 the list of potential participants from the user. In an embodiment, the social deal manager 250 activates 840 the social deal if the number of potential participants provided by the user exceeds a threshold value. Alternatively, the social deal manager 250 may send a message to the potential participants asking them to confirm if they are interested in participating in the social deal. If the social deal manager 250 receives confirmation messages from more than a threshold number of potential participants selected by the user, the social deal manager 250 activates the social deal. The social deal manager 250 sends a message to the user informing 850 the user of the activation of the deal.

In an embodiment, each connection of the user that is a participant is allowed to add participants to the deal. This allows connections of the connections of the user to be included as participants in the deal. This allows actions of users of the social networking system to be associated with the deal in a viral fashion. Since each connection of the user can associate actions performed by connections of the connection, the number of actions associated with the deal can increase at a fast rate.

In one embodiment, the benefit offered by the deal to each participant depends on the number of connections of each user participating in the deal. For example, if five connections of a first user participated in a deal and only three connections of a second user participated in the deal, the first user gets larger benefit based on the deal compared to the second user. In this example, the first user may get 20% discount on a purchase where as the second user may get only 15% discount on a similar purchase. In an embodiment, the benefit offered by the deal to each participant depends on the number of actions relevant to the deal performed by the connections of each user participating in the deal. The same connection of a user participating in the deal can perform multiple actions that are specified by the deal as valid actions for activating the deal. For example, the same user may perform two or more different types of actions, including checking in to a location associated with the deal, making a purchase, registering with the provider, each action counting towards activation of the deal. As a result, even though the number of connections of the user participating in the deal may be low, the user may get high benefits of the deal if each connection of the user is performs multiple actions that count towards activation of the deal.

Socializing a Deal

In an embodiment, the social deal manager 250 converts a given deal to a social deal. For example, an existing deal may require participation by a single user. However the deal can be converted to a social deal by requiring participation by additional users, for example, connections of the user. The social deal manager 250 determines whether there is advantage to either the provider or the social networking system 100 by making a deal social. The social deal manager 250 can determine whether to socialize a deal based on the type of the deal. Certain types of deals typically are associated with a social activity, for example, a deal of a restaurant, a concert deal etc. The social deal manager 250 can also determine whether to socialize a deal based on past information associated with the user, for example, how successful the user has been in coordinating social deals in the past. By socializing a deal, the social networking system 100 promotes the product or service offered by the provider as well as social activity using the social networking system 100.

The social deal manager 250 may use various criteria to determine whether to socialize a deal or not. The social deal manager 250 can use past historical information stored in the social networking system 100 to determine how successful social deals are for various categories. For example, certain types of activities including dining, playing games like golf, social events including concerts or movies typically involve participation of multiple persons. Social deals are likely to be more successful for these categories of deals. Another criterion for determining whether to socialize a deal includes past historical data associated with a user. For example, the social deal manager 250 may determine that a particular user is more likely to participate in a social deal than another based on past actions of the user. For example, a user may have a large number of connections and may have participated in several social deals in the past. This social deal manager 250 is likely to socialize a deal for this user compared to another user with very few friends on the social networking system 100 who has never initiated a request for participation in a social deal.

The social deal manager 250 may determine specific attributes of a social deal for each user for who a deal is socialized. For example, the social deal manager 250 can analyze social information associated with the user to determine a threshold number of actions required for activating the deal. In an embodiment, the connections of the user are analyzed to determine a total number of potential participants for the social deal. The social deal manager 250 may determine a score indicative of likelihood of participation in the social deal for each connection of the user. Connections of the user that have a score above a threshold value are determined as potential participants. The total number of participants required for the social deal or the total number of actions required from connections of the user for activation of the social deal is determined based on the total number of potential participants. Depending on the number of potential participants a benefit provided by the deal may be determined. For example, a user with a large number of potential participants may be provided higher benefits compared to a user with fewer participants. The information describing the socialized deal is presented to the user.

The social networking system 100 executes various actions related to the transaction corresponding to the deal purchase. The social networking system 100 receives revenue as part of the payments sent by the participants. The social networking system 100 receives a portion of the revenue obtained from the transaction for facilitating the transaction. The social networking system 100 determines a platform share of the revenue and a provider's share of the revenue. The platform share may be determined based on a predetermined arrangement, for example, a fixed percent of the transaction or a fixed value for each transaction. The social networking system 100 sends the provider's share to the provider. The social networking system 100 sends a portion of the platform share to the users participating in the social deal. The portion of the platform share may be sent only to the users that send the payment.

The social networking system 100 may provide a portion of the platform share to the user by providing a better deal price for the user rather than explicitly providing a portion of the platform share. In this situation, the deal price offered by the provider differs from the deal price actually paid by the users. For example, the provider may offer a fixed price to all participants of a deal but a participant buying the deal from the social networking system 100 may pay a different price, for example, each participant may pay a different price depending on the social information associated with the participant. The share of revenue from the transaction sent to the provider is based on the price offered by the provider. The difference in the price offered by the provider and the price actually paid by each user is made up by the portion of platform share for each user.

In an embodiment, the portion of platform share that is sent to the users is determined based on social information associated with each user. For example, a user who had more active participation in the social deal, for example, by suggesting names of potential participants may get a bigger share of the platform share compared to a user with less active participation. The social networking system 100 may provide a bigger portion of platform share to a user that has more connections participating in the deal compared to a user with fewer connections participating in the deal. The social networking system 100 may provide a bigger portion of the platform share to a participant who has more connections in the social networking system 100 compared to a participant who has fewer connections. A user who has a large number of connections in the social networking system 100 has a greater potential to virally spread the information describing the social deal to other users of the social networking system 100. A larger dissemination of useful information via the social networking system 100 promotes growth of the social networking system 100 since more users find value in using the social networking system 100. Larger growth of the social networking system 100 results in larger advertisement revenues for social networking system 100 since more providers are interested in advertising via the social networking system 100. Therefore, the social networking system 100 rewards users with higher potential to promote growth of the social networking system 100.

Alternative Applications

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer implemented method comprising:
storing information for a deal, wherein the deal comprises an offer that can be accepted by a user alone;
for a particular user of a social networking system:
observing interactions of the particular user with the social networking system, the interactions associated with deals,
determining, by a computer, a likelihood of participation of the particular user in one or more future social deals based on participation of the particular user in past social deals, a social deal comprising an offer that can be accepted by the particular user only with one or more other users connected to the particular user in the social networking system, and
converting, by the computer, the deal to a social deal based on the likelihood of the particular user participating in one or more future social deals;
identifying a set of connections of the user as potential participants of the social deal based on a likelihood of participation in the social deal of the connections of the user, the likelihood of participation determined based on past interactions of the connections with the social networking system;
determining a criteria for activation of the social deal based on the identified set of connections;
sending information describing the criteria for activation of the social deal to the user;
presenting on a display of a client device, a first user interface including the information describing the criteria for activation of the social deal, the first user interface allowing the particular user to view and interact with the social deal, the first user interface presenting the set of connections of the particular user as the potential participants of the social deal, wherein interacting with the social deal includes adding or deleting the potential participants in the social deal to select participants of the social deal;
for each of the participants of the social deal, presenting a second user interface for receiving user interactions from a participant, the user interactions comprising participating in the social deal, commenting on the social deal, and liking the social deal;
activating the deal based on user interactions received from each of the participants, the user interactions received via the second user interface;
receiving revenue from the participants of the social deal;
transferring a portion of the received revenue from the social networking system to a provider of the deal, thereby leaving a platform share from the received revenue;
determining an amount of the platform share to provide to each of the participants of the social deal, the amount of the platform share for each participant of the social deal determined based on a total number of connections of the participant of the social deal; and
providing the determined amounts of the platform share of the received revenue back to the participants of the social deal.

2. The computer implemented method of claim 1, wherein determining the likelihood of participation of the particular user in one or more future social deals comprises checking whether the particular user has more than a threshold number of connections.

3. The computer implemented method of claim 1, the method comprising:
determining whether to convert the deal to a social deal based on a category associated with the deal received from a provider.

4. The computer implemented method of claim 1, further comprising:
for the particular user of the social networking system:
sending information describing the social deal to other users with whom the particular user is connected in the social networking system.

5. The computer implemented method of claim 1, further comprising:
for the particular user of the social networking system:
suggesting a set of other users with whom the particular user is connected in the social networking system,
receiving a selection of other users from the particular user, and
sending information describing the social deal to the selected other users.

6. The computer implemented method of claim 5, wherein the set of other users suggested is determined by matching information describing users connected to the particular user with the social deal.

7. The computer implemented method of claim 1, further comprising:
determining whether an activity associated with the deal is predetermined to be a social activity.

8. The computer implemented method of claim 1, further comprising:
determining whether the deal belongs to a particular category of deals, wherein the particular category of deals is associated with social deals.

9. The computer implemented method of claim 1, wherein determining the likelihood of participation of the particular user in one or more future social deals comprises determining whether the particular user participated in more than a threshold number of previous social deals.

10. A non-transitory computer-readable storage medium storing computer-executable code, the code comprising instructions for:
storing information for a deal, wherein the deal comprises an offer that can be accepted by a user alone;
for a particular user of a social networking system:
observing interactions of the particular user with the social networking system, the interactions associated with deals,
determining, by a computer, a likelihood of participation of the particular user in one or more future social deals based on participation of the particular user in past social deals, a social deal comprising an offer that can be accepted by the particular user only with one or more other users connected to the particular user in the social networking system, and
converting, by a computer, the deal to a social deal based on the likelihood of the particular user participating in one or more future social deals;
identifying a set of connections of the user as potential participants of the social deal based on a likelihood of participation in the social deal of the connections of the user, the likelihood of participation determined based on past interactions of the connections with the social networking system;
determining a criteria for activation of the social deal based on the identified set of connections;
sending information describing the criteria for activation of the social deal to the user;
presenting on a display of a client device, a first user interface including the information describing the criteria for activation of the social deal, the first user interface allowing the particular user to view and interact with the social deal, the first user interface presenting the set of connections of the particular user as the potential participants of the social deal, wherein interacting with the social deal includes adding or deleting the potential participants in the social deal to select participants of the social deal;

for each of the participants of the social deal, presenting a second user interface for receiving user interactions from a participant, the user interactions comprising participating in the social deal, commenting on the social deal, and liking the social deal;

activating the deal based on user interactions received from each of the participants, the user interactions received via the second user interface;

receiving revenue from the participants of the social deal;

transferring a portion of the received revenue from the social networking system to a provider of the deal, thereby leaving a platform share from the received revenue;

determining an amount of the platform share to provide to each of the participants of the social deal, the amount of the platform share for each participant of the social deal determined based on a total number of connections of the participant of the social deal; and providing the determined amounts of the platform share of the received revenue back to the participants of the social deal.

11. The non-transitory computer-readable storage medium of claim 10, wherein determining the likelihood of participation of the particular user in one or more future social deals comprises checking whether the particular user has more than a threshold number of connections.

12. The non-transitory computer-readable storage medium of claim 10, the code further comprising instructions for:
determining whether an activity associated with the deal is predetermined to be a social activity.

13. The non-transitory computer-readable storage medium of claim 10, the code further comprising instructions for:
determining whether the deal belongs to a particular category of deals, wherein the particular category of deals is associated with social deals.

* * * * *